United States Patent [19]

Carow

[11] Patent Number: 4,905,733

[45] Date of Patent: Mar. 6, 1990

[54] BREAKAWAY HOSE COUPLING

[75] Inventor: Walter M. Carow, Roane County, Tenn.

[73] Assignee: Richards Industries, Inc., Rockwood, Tenn.

[21] Appl. No.: 295,578

[22] Filed: Jan. 11, 1989

[51] Int. Cl.[4] .............................................. F16L 29/00
[52] U.S. Cl. .................................. 137/614.04; 285/310
[58] Field of Search ......................... 137/614, 614.04; 285/308, 310, 314, 316, 358, 394

[56] References Cited

U.S. PATENT DOCUMENTS

| 2,397,265 | 3/1946 | Jacobson et al. | 137/614.04 X |
| 3,097,867 | 7/1963 | Saloum | 137/614.03 X |
| 3,211,178 | 10/1965 | Kiszko | 137/614.04 |
| 3,435,848 | 4/1969 | Johnston | 137/614.04 |
| 4,402,533 | 9/1983 | Ortoff | 285/314 X |
| 4,691,941 | 9/1987 | Rabushka | 285/316 X |

FOREIGN PATENT DOCUMENTS

| 491000 | 2/1976 | U.S.S.R. | 137/614.04 |
| 1088640 | 10/1967 | United Kingdom | 285/316 |

Primary Examiner—John Fox
Attorney, Agent, or Firm—Pitts and Brittian

[57] ABSTRACT

An improved breakaway hose coupling (10) for releasably joining the hose ends of two fluid communicating hoses. The coupling (10) comprises first and second valve assemblies (12 and 14) for being secured on the hose ends and for selectively sealing the hose ends when the coupling (10) is disengaged. The first valve assembly (12) includes a first valve housing (18) having a forward end portion (22), and the second valve assembly (14) includes a second valve housing (20), also defining a forward end portion (22). The coupling (10) also comprises a latch housing (48) which circumscribes and extends outwardly from the forward end portion (22) of the second valve housing (20) so as to define a receptor for closely receiving the forward end portion (22) of the first valve housing (18). A ball latch mechanism is mounted within the latch housing (48) which secures the first valve housing (18) in the receptor in absence of disengaging force in excess of a preselected value. Also provided is a reset means for allowing the ball latch mechanism to be disengaged in absence of disengaging force in excess of such preselected value.

6 Claims, 4 Drawing Sheets

BREAKAWAY HOSE COUPLING

TECHNICAL FIELD

This invention relates to an improved breakaway hose coupling for releasably joining the hose ends of two fluid communicating hoses and for selectively disengaging such hose ends in response to a disengaging force in excess of a preselected value being exerted on the hoses and/or the coupling. The coupling generally comprises a pair of valve assemblies releasably secured together in fluid communication by a disconnect means.

BACKGROUND ART

Filling stations for dispensing gasoline and other fuels have long had a problem with vehicles pulling away from the fuel dispensing pump with the dispensing nozzle still inserted in the vehicle's tank, or with the nozzle or dispensing hose otherwise secured or hung on the vehicle. Such incidences usually result in damage to the dispensing pump and/or breakage of the dispensing hose. It will be appreciated that repairing the resulting damage to the dispensing pump and hose can be extremely costly. Further, the fuel spillage which can result from such damage can create a dangerous and possibly life threatening condition. Attempts have been made to overcome this problem by installing two hoses joined by a breakaway coupling device on the dispensing pump, with the coupling device designed to disengage and seal the hoses when pressure is exerted on the coupling as in the case where a vehicle pulls away from the pump with the nozzle or hose attached. Certain devices of this type are disclosed in U.S. Pat. No. 4,675,525 and the patents cited therein, and other such devices are disclosed in the following patents:

U.S. Pat. No. 2,559,935
U.S. Pat. No. 2,898,130
U.S. Pat. No. 3,336,944
U.S. Pat. No. 3,435,848
U.S. Pat. No. 3,460,801
U.S. Pat. No. 3,520,331
U.S. Pat. No. 3,719,194
U.S. Pat. No. 4,449,545
U.S. Pat. No. 4,646,773
USSR Pat. No. 363,833

However, these devices are generally either unable to withstand the rigors of the fuel pumping operation, or are difficult to install. Moreover, once installed, many such devices are difficult to disengage in absence of the preselected disengaging force being applied to the coupling and difficult to recouple after the coupling has disengaged.

Therefore, it is an object of the present invention to provide an improved breakaway hose coupling device for releasably joining the hose ends of two fluid communicating hoses.

Another object of the present invention is to provide an improved breakaway hose coupling device for selectively disengaging and sealing the hose ends of two hoses in response to disengaging force in excess of a preselected value being exerted on the coupling device.

Still another object of the present invention is to provide an improved breakaway hose coupling device which is less disruptive of fluid flow than conventional coupling devices.

A further object of the present invention is to provide an improved breakaway hose coupling device which is easy to install.

Yet another object of the present invention is to provide an improved breakaway hose coupling device which can be easily recoupled after being excess of a preselected value being applied to the coupling, and easily uncoupled in absence of such disengaging force.

Another object of the present invention is to provide an improved breakaway hose coupling device which is inexpensive to manufacture and maintain.

DISCLOSURE OF THE INVENTION

Other objects and advantages will be accomplished by the present invention which provide an improved breakaway hose coupling for releasably joining the hose ends of two fluid communicating hoses and for selectively disengaging such hose ends in response to a disengaging force in excess of a preselected value being exerted on the hoses and/or the coupling. The hose coupling comprises first and second valve assemblies for being secured on the hose ends and for selectively sealing the hose ends when the coupling is disengaged. The first valve assembly includes a first valve housing having a forward end portion, and the second valve assembly includes a second valve housing, also defining a forward end portion. A latch housing circumscribes and extends outwardly from the forward end portion of the second valve housing so as to define a receptor for closely receiving the forward end portion of the first valve housing. A ball latch mechanism is mounted within the latch within the receptor in the absence of disengaging force in excess of a preselected value, and which allows the first valve housing to disengage when disengaging force in excess of such value is applied. Also included is a reset means for allowing the ball latch mechanism to be disengaged in absence of disengaging force in excess of the preselected value.

BRIEF DESCRIPTION OF THE DRAWINGS

The above-mentioned features of the present invention will become more clearly understood from the following detailed description of the invention read together with the drawings in which.

BEST MODE FOR CARRYING OUT THE INVENTION

A breakaway hose coupling device incorporating various features of the present invention is illustrated generally at 10 in the figures. The coupling device 10 is designed to accomplish the fluid impervious coupling of hose ends (not shown) of two fluid communicating hoses such as the hoses used in association with a fuel dispensing pump. The coupling device 10 is further designed to breakaway or disengage upon separation force in excess of a preselected value being applied against the coupling and to seal the disengaged hose ends. Whereas, the device 10 will be discussed at times herein in terms of joining fuel dispensing hoses, it will be appreciated that the device can be used to releasably join various types of hoses carrying various fluids.

Figure 1:
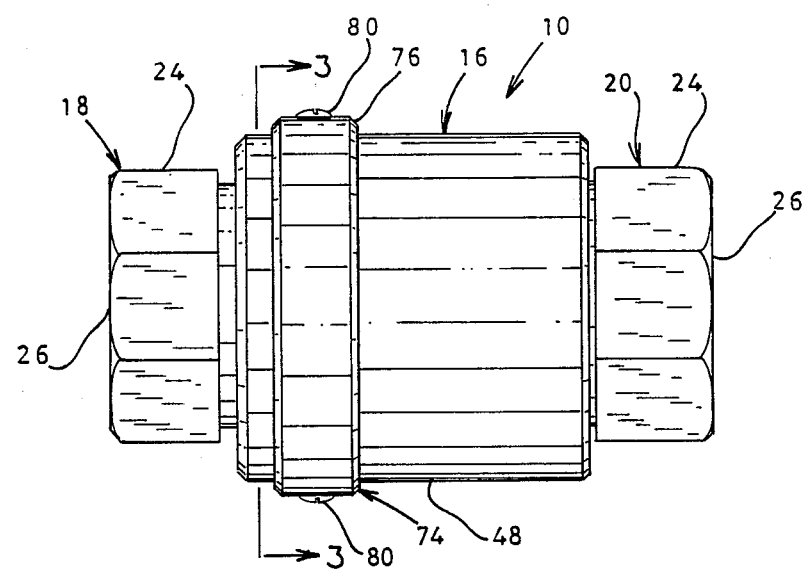
FIG. 1 illustrates a side elevation view of an improved breakaway hose coupling of the present invention.
Figure 2:
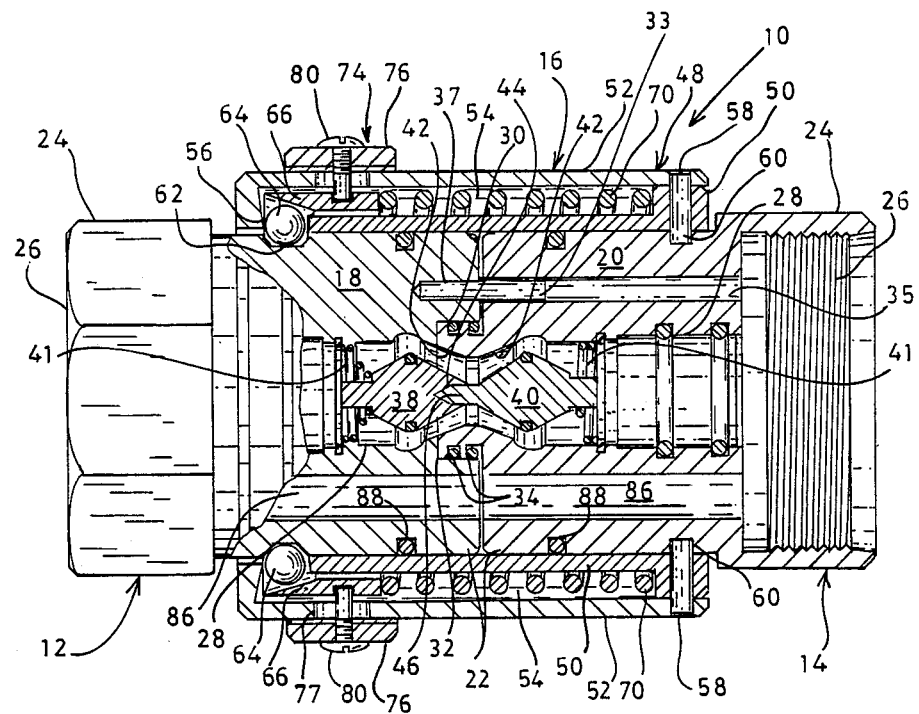
FIG. 2 illustrates a side elevation view, partially in section, of an improved breakaway hose coupling of the present invention.

The breakaway hose coupling device 10 generally comprises first and second valve assemblies 12 and 14, respectively, for being releasably mounted on the hose ends to be joined, and disconnect means 16 for releasably joining the valve assemblies 12 and 14 in the absence of axial disengaging force in excess of a preselected value and for releasing at least one of the valve assemblies 12 or 14 in response to such axial disengaging force in excess of a preselected value. As is best illustrated in FIG. 2, the first and second valve assemblies 12 and 14 comprise first and second valve housings 18 and 20, respectively, each of the housings 18 and 20 having a forward end portion 22 for being closely received in the disconnect means 16 and a rearward end portion 24 for releasably engaging a hose end. It will be noted that in the preferred illustrated embodiment, the rearward end portions 24 define the threaded receptors 26 for threadably receiving a hose end, but it will be understood that other suitable means can be used to releasably secure the rearward end portions 24 to their respective hose ends. Further, each of the valve housings 18 and 20 define a passageway 28 extending axially therethrough such that the passageways 28 are in fluid communication with the hose end to which the respective housings 18 and 20 are secured, and are in fluid communication with each other as the housings 18 and 20 are seated in the disconnect means 16. Resultantly, as the housings 18 and 20 are seated in the means 16, the passageways 28 cooperatively place the hose end secure to the housing 18 in fluid communication with the hose end secure to the housing 20.

Also, in the preferred embodiment, the forward end portion 22 of the valve housing 18 releasably engages the forward end portion 22 of the valve housing 20 such that the housings 18 and 20 are joined in axial alignment. In this regard, the housing 18 is provided with an axially disposed annular receptor 30 which closely receives a coaxial annular lip member 32. To insure the fluid impervious integrity of the coupling, suitable seal means are provided between the lip member 32 and the receptor 30. In the illustrated embodiment, such means includes one or more 0-ring seals 34 which are received in annular grooves circumscribing the lip member 32. It will also be noted that one or more securing pins 33 can be inserted through the hole(s) 35 in the housing 20 and into the receptor 37 of the housing 18 to prohibit rotation of the housings 18 and 20 with respect to one another.

In order to automatically seal the hose ends on which the valve housings 18 and 20 are secured when the housings 18 and 20 disengage, each of the valve assemblies is provided with valve means for sealing the passageways 28. In the preferred embodiment, the valve means includes the poppet valves 38 and 40 axially mounted in the passageways 28 of the valve housings 18 and 20, respectively. Also provided are the spring members 41 which serve both as means for mounting the poppet valves and as biasing means to bias the valves 38 and 40 toward the valve seats 42 defined by the sidewalls of the passageway 28. As illustrated in FIG. 2, as the housings 18 and 20 are joined within the disengaging means 16, the forward portions of the valves releasably engage one another, thereby holding the valves in an open position. More specifically, the valve 38 is provided with as alignment pin receptor 44 which receives an axially disposed alignment pin 46 carried by the forward portion of the valve 40. Resultantly, the valves are held in an axially aligned open position when the housings 18 and 20 are joined thereby permitting fluid to be communicated from one hose end to the other through the passageways 28. However, when the housings disengage, the pin 46 is removed from the receptor 44 and the spring members 41 bias the valves 38 and 40 against their respective valve seats 42 thereby sealing the hose ends.

Figure 6:
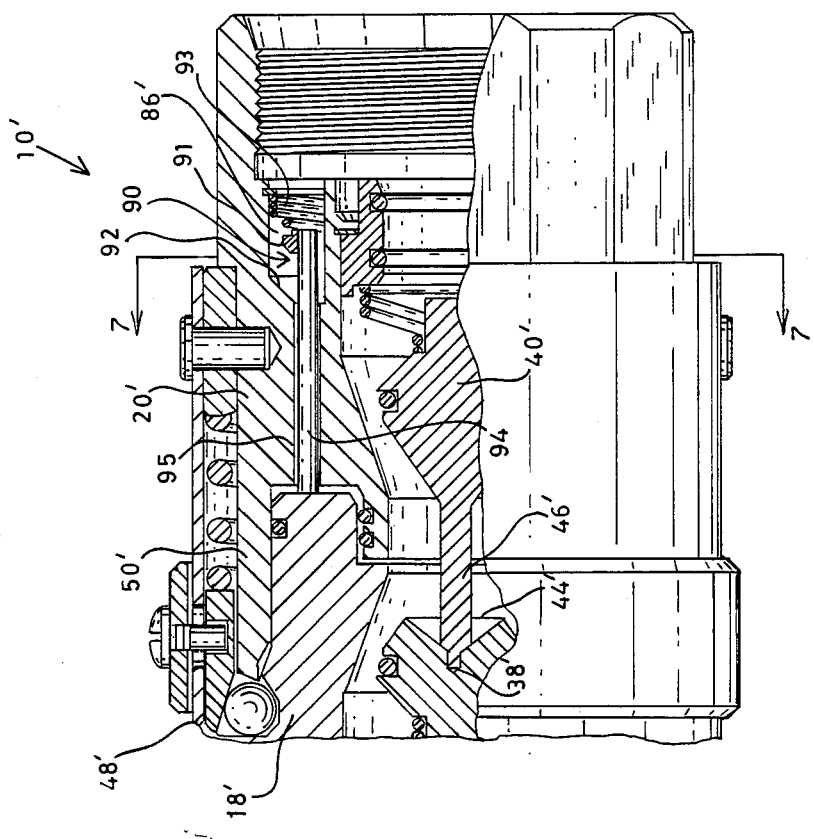
FIG. 6 illustrates a partial side elevation view, partially in section, of an alternate embodiment of an improved breakaway hose coupling of the present invention.

It will also be noted that in FIG. 6 an alternative alignment pin receptor is illustrated at 44'. The receptor 44', or at least a portion thereof, is substantially conical in configuration, and it will be recognized that the opening accessing the receptor 44' is substantially larger than the cross-sectional diameter of the pin 46' to facilitate the insertion of the pin 46' into the receptor 44' yet the conical side walls of the receptor 44' closely receive the conical walls of the pin 46' to insure proper alignment.

As indicated above, the disconnect means 16 serves not only to releasably couple the valve housings 18 and 20 during normal operation, but allows the housings to be uncoupled when axial disengaging force in excess of a preselected value is applied to the coupling. The disconnect means 16 generally comprises an annular latch housing 48 which closely receives the valve housings 18 and 20, and which houses a ball latch mechanism. More specifically, the latch housing 48 includes a seal ring 50 which circumscribes and closely receives the housings 18 and 20 and an outer sleeve 52, with the seal ring 50 and the sleeve 52 cooperatively defining a latch cavity 54. Also, it will be noted that the seal ring 50 and sleeve 52 cooperatively define a latch ball aperture 56 operatively associated with the ball latch mechanism. In the preferred embodiment, the valve housing 20 is releasably secured in the latch housing 48 with suitable fasteners such as the pins 58 which are received through holes provided in the latch housing 48 to be received in registering receptors 60 provided in the valve housing 20. However, it will be recognized by those skilled in the art that the latch housing 48, or components thereof, can be fixedly secured to, or integral with, the valve housing 20 if desired. For example, in the alternate embodiment of FIG. 6, the seal ring 50' is integral with the second valve housing 21'. With either construction, the second valve housing 20 and the latch housing 48 cooperatively define a receptor which closely receives the first valve housing 18 to effect coupling.

As indicated above, the valve housing 18 is also closely received by the latch housing 48, and the ball latch mechanism serves to releasably secure the valve housing 18 in the latch housing 48 in the absence of disengaging force in excess of a preselected value. In order to facilitate the securing of the valve housing 18, the housing 18 is provided with an external annular groove 62 having sloped sidewalls which registers with the latch ball aperture 56 as the valve housing 18 is received in the latch housing 48. The ball latch mechanism includes a plurality of latch balls 64 which can be received through the latch ball aperture 56 and into the groove 62 of the valve housing 18, yet are retractable into the cavity 54 of the latch housing to allow the balls 64 to be removed from the groove 62.

Figure 4:
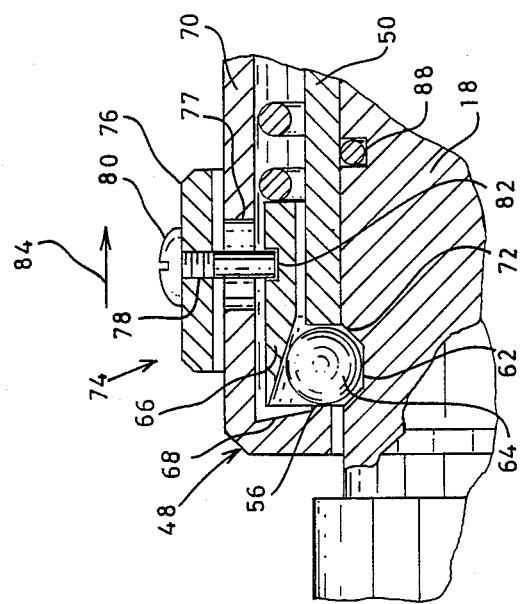
FIG. 4 illustrates a partial side elevation view, partially in section, of an improved breakaway hose coupling of the present invention.

The ball latch mechanism also includes a locking means for releasably locking the balls 64 in a position whereby a portion of the balls 64 extend into the groove 62 so as to lock the valve housing 18 within the latch housing 48. In the preferred embodiment, such means includes an axially movable tapered ring 66 housed within the cavity 54, the ring 66 defining a camming surface 68 for engaging the balls 64 and forcing the balls 64 into the groove 62 (See FIG. 4). In this regard the tapered ring 66 is spring loaded in an axial direction by a spring member 70 to provide a radial load to the ring of balls 64 forcing them into the groove 62 with a magnitude defined by the geometry and by the spring force. However, as is best illustrated in FIG. 4, the application of axial disengaging force, or pull, on the valve housing 18 causes a resolution of the axial disengaging force to the balls 64 via the sloping sidewall 72 of the groove 62. The load transmitted to the balls 64 is transmitted to the tapered ring and, in turn, to the spring member 70 which yields proportional to the loading. As the spring member 70 yields, it permits the tapered ring 66 to move axially providing increased radial freedom for the balls 64 which ride up the sloping sidewall 72 until they no longer extend into the groove. Thus, the balls 64 no longer serve to retain the valve housing 18 within the latch housing 64, thereby allowing the housing 18 to disengage. Of course, as discussed above, as the valve housing 18 disengages and the housings 18 and 20 separate, the valves 38 and 40 serve to seal their respective passageways 28 to terminate the flow of fluid from the hose ends.

It will be recognized by those skilled in the art that the axial disengaging force necessary to disengage the housing 20 from the latch housing can be preselected through the use of a spring member 70 which provides a preselected biasing force. Thus, where the device 10 is used to connect fuel supply hoses associated with a fuel dispensing pump, a spring member 70 can be selected which maintains the engaged position of the valve housing 18 during normal operation, but allows disengagement when disengaging force sufficient to damage the supply pump is exerted on the coupling.

As illustrated in the figures, the disconnect means 16 also includes the reset means 74 which allows the ball latch mechanism to be placed in a disengaged position notwithstanding an absence of disengaging force on the valve housings. More specifically, in the preferred embodiment, the reset means 74 comprises a reset member, such as the reset ring 76. The reset ring 76 is slidably received about the latch housing 48, and the sleeve 52 is provided with one or more slots 77 which allow the reset ring 76 to be connected to the tapered ring 66. As illustrated in FIG. 4, in the preferred embodiment the reset ring 76 is provided with a threaded hole 78 which threadably receives the bolts 80, the bolts 80 having free end portions which are received in the receptors 82 provided in the tapered ring. It will be appreciated, however, that other suitable means can be used to connect the reset ring 76 and the tapered ring 66.

It will be recognized that axial movement of the externally mounted reset ring in the direction indicated by the arrow 84 moves the tapered ring 66 axially against the spring member 70 to release its loading of the balls 64 such that the valve housing 18 can be easily reinserted to reconnect the coupling device 10 after disengagement. Thus, the user can directly retract the tapered ring 66 to allow the balls 64 to move radially into the latch housing 48, and can reengage the ball latch mechanism when the valve housing 18 is seated in the housing 48 by releasing the reset ring 76, thereby obviating the need to disassemble and reassemble the device to reconnect the coupling. The reset means 74 also provides a quick and efficient means for disconnecting the coupling in absence of the preselected disengaging force otherwise necessary to disengage the housing 20.

Figure 5:
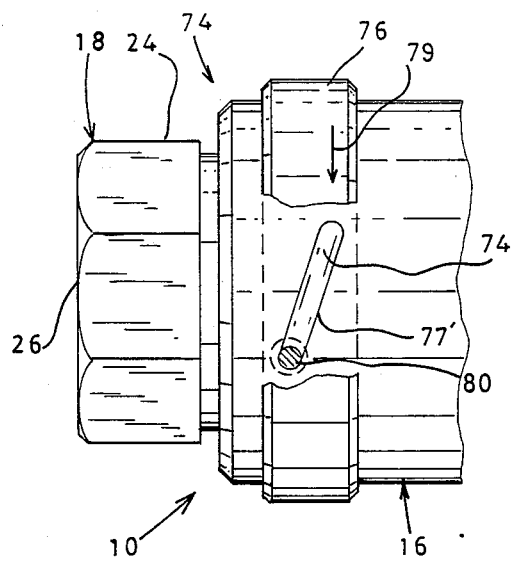
FIG. 5 illustrates a partial side elevation view, partially in section, of an alternate embodiment of an improved breakaway hose coupling of the present invention.

In FIG. 5, an alternate embodiment of the reset means is illustrated wherein the slot(s) 77' is diagonally aligned with respect to the axis of the coupling rather than axially aligned as in FIG. 2. Thus, to effect rearward movement of the tapered ring 66, the reset ring 76 is rotated in the direction of the arrow 79 such that the edges of the slot 77' cam the bolt 80, and thus, the ring 66 rearwardly.

Figure 3:
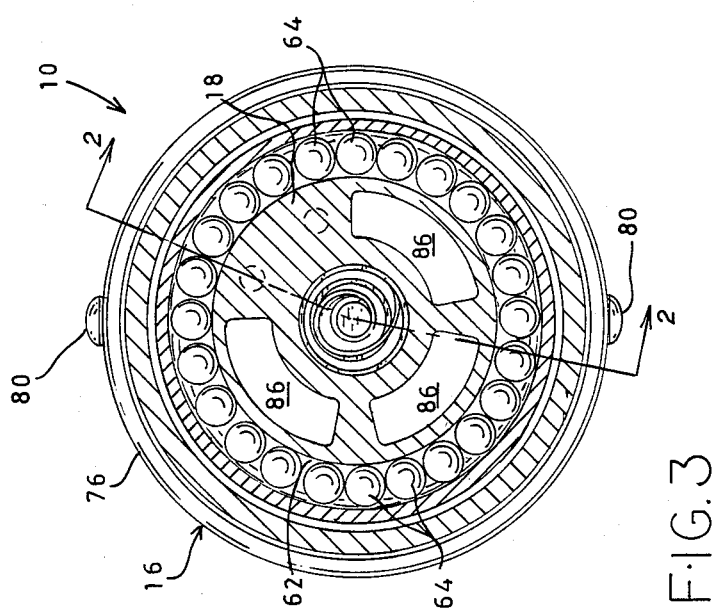
FIG. 3 illustrates an end view, in section, of an improved breakaway hose coupling of the present invention.

Those skilled in the art will also appreciate that in certain legal jurisdictions, a fuel dispensing hose (not shown) must incorporate a vapor conduit for recapturing vaporized fuel generated at the dispensing nozzle during the dispensing operation. Such hoses generally comprise a hose within a hose with the inner hose serving to carry fuel and the outer hose serving to define a vapor passage. As illustrated in FIGS. 2 and 3, valve housings 18 and 20 can be provided with the vapor passages 86 in order to connect the vapor passages of coupled hoses in fluid communication. It will also be noted that when the vapor passages 86 are utilized, seal means, such as the 0-ring seals 88, are provided between the housings 18 and 20 and the latch housing 48 to prohibit fuel vapor from escaping the coupling device 10. Further, the seals 88 serve as a back-up seal to prohibit fuel from escaping the coupling should the seals 34 fail.

Figure 8:
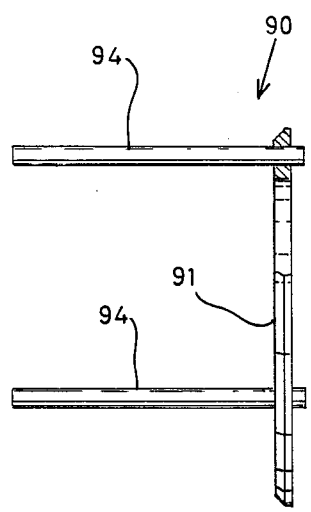
FIG. 8 illustrates a side elevation view of a vapor valve of one embodiment of an improved breakaway hose coupling of the present invention.
Figure 9:
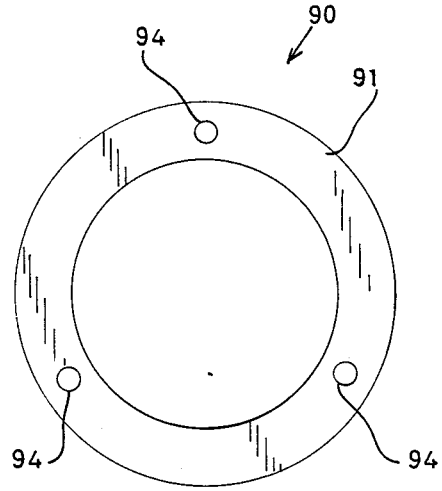
FIG. 9 illustrates an end view of a vapor valve of one embodiment of an improved breakaway hose coupling of the present invention.
Figure 7:
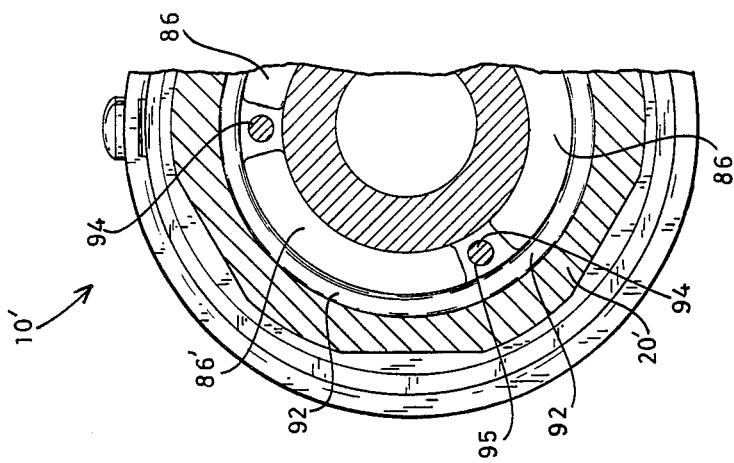
FIG. 7 illustrates a partial end view, in section, of an alternate embodiment of an improved breakaway hose coupling of the present invention.

It will be recognized by those skilled in the art that when vapor passages 86 are provided, it is desirable that the vapor passages be sealed upon the disengaging of the hose ends such that fuel vapor does not escape. In FIGS. 6 and 7 an alternate embodiment of the coupling of the present invention is illustrated at 10'. In this embodiment, means are provided for sealing the vapor passages 86' as the housings 18' and 20' separate, such means comprising a vapor valve 90 mounted in the second valve housing 20'. As is best illustrated in FIGS. 8 and 9, the valve 90 includes a ring-shaped valve body 91 which is axially reciprocatable so as to selectively seat against a valve seat 92 defined by the sidewalls of the vapor passages 86' in order to selectively seal the passages 86'. The valve body 91 is biased toward the valve seat 92 with a spring 93 such that when the housings 18' and 20' are separated, the vapor passages 86' of the housing 20' are sealed. However, the valve 90 includes one or more actuator pins 94 which extend through holes 95 in the body 20' to extend into the receptor which receives the housing 18'. Resultantly, as the housing 18' is inserted into the receptor, the pins 94 are forced rearwardly, thereby moving the body 91 away from the valve seat 92 and opening the vapor passages 86'. Thus, only when the housing 18' and 20' are coupled are the vapor passages 86' of the housing 20' unsealed. Of course, it will be understood that the housing 18' can also be provided with the above-described means for sealing vapor passages such that the vapor passages of the housing 18' are also sealed when the housing is disengaged.

In light of the above, it will be appreciated that the present invention provides an improved breakaway hose coupling device with great advantages over the prior art. The device 10 provides a coupling which automatically disengages and seals the hose ends in response to axial force in excess of a preselected value, and which can be manually disengaged, or reset, quickly and easily without disassembly of the device. Further, the device 10 incorporates a ball latch mechanism which permits a full complement of balls 64 around the circumference of the valve housing 20, thus, providing maximum load capacity with minimum ball and housing contact stresses.

While a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. An improved breakaway hose coupling device for releasably joining the hose ends of two fluid communicating hoses and for selectively disengaging said hose ends in response to a disengaging force in excess of a preselected value being exerted on said hoses and/or said coupling, said coupling device comprising:

a first valve assembly for being secured on one said hose end and for selectively sealing said hose end to the flow of said fluid, said first valve assembly including a first valved housing having a forward end portion, said first valve housing being provided with an annular groove circumscribing said first valve housing;

a second valve assembly for being secured on another said hose end and for selectively sealing said hose end to the flow of said fluid, said second valve assembly including a second valve housing having a forward end portion;

a latch housing circumscribing and extending outwardly from said forward end portion of said second valve housing so as to define a receptor for closely receiving said forward end portion of said first valve housing, said latch housing further defining a latch cavity and defining a latch ball aperture for registering with said annular groove of said first valve housing as said first valve housing is received in said receptor, said latch housing being provided with a slot communicating said latch cavity;

ball latch means housed within said latch cavity for securing said first valve housing within said receptor in absence of said disengaging force in excess of said preselected value, said ball latch means including a plurality of latch balls for being received in said latch cavity of said latch housing, and for being selectively received through said latch ball aperture and into said latch ball groove of said first valve housing, said ball latch means further including locking means for releasably locking said latch balls in a position whereby at least a portion of said balls extend into said annular groove of said first valve housing in absence of said disengaging force in excess of said preselected valve and for releasing said latch balls for retraction into said latch cavity in response to said disengaging force in excess of said preselected valve, said locking means including a tapered ring housed within said latch cavity, said tapered ring defining a camming surface for engaging said latch balls and biasing said balls into said annular groove of said first valve housing, said locking means further including spring means housed within said latch cavity for biasing said tapered ring into engagement with said latch balls; and reset means for selectively disengaging said ball latch means in absence of said disengaging force in excess of said preselected valve, whereby the selective insertion of said first valve housing into said receptor and the selective disengaging of said first valve housing from said receptor is facilitated, said reset means including at least one reset member located exterior to said latch housing whereby said ball latch means can be selectively disengaged without disassembly of said hose coupling, said reset member engaging said tapered ring through said slot in said latch housing whereby selected movement of said reset member serves to move said tapered ring against the bias of said spring means thereby allowing said latch balls to retract into said latch cavity and allowing disengagement of said first valve housing from said latch housing.

2. The improved breakaway hose coupling of claim 1 wherein said reset member comprises an annular ring circumscribing said latch housing.

3. An improved breakaway hose coupling device for releasably joining the hose ends of two fluid communicating hoses and for selectively disengaging such hose ends in response to a disengaging force in excess of a preselected value being exerted on such hoses and/or said coupling, said coupling device comprising:

a latch housing defining a passage therethrough, and first and second oppositely disposed opening for accessing said passage, said latch housing further defining a latch cavity and a latch ball aperture, said latch housing being provided with at least one slot communicating with said latch cavity;

first and second valve assemblies for being releasably secured on said hose ends and for selectively sealing said hose ends to the flow of said fluid, said first valve assembly including a first valve housing having a forward end portion for being releasably received in said first opening of said latch housing, said first valve housing being provided with an annular groove circumscribing said valve housing for registering with said latch ball aperture of said latch housing as said first valve housing is received in said latch housing, said second valve assembly including a second valve housing having a forward end portion for being secured in said second opening of said latch housing, whereby fluid communications between said hose ends is established as said first and second valve housing are received in said latch housing and terminated upon the removal of at least one of said valve housing from said latch housing;

ball latch means housed within said cavity of said latch housing for securing said first valve housing in said latch housing in absence of said disengaging force in excess of said preselected value, said ball latch means including a plurality of latch balls for being received in said latch cavity of said latch housing, and for being selectively received through said latch ball aperture and into said latch ball groove of said first housing, said ball latch means further including locking means for releasably locking said latch balls in a position whereby at least a portion of said balls extend into said annular groove of said first valve housing in absence of said disengaging force in excess of said preselected value, a nd for releasing said latch balls for retraction into said latch cavity in response to said disengaging force in excess of said preselected value, said locking means including a tapered ring housed within said latch cavity, said tapered ring defining a camming surface for engaging said latch balls and biasing said balls into said annular groove of said fist valve housing, and further including spring means housed within said latch cavity for biasing said tapered ring into engagement with said latch balls; and reset means for selectively disengaging said ball latch means in absence of said disengaging force in excess of said preselected value, whereby the selective insertion of said first valve housing into said receptor and the selective disengaging of said first valve housing from said receptor is facilitated, said reset means including at least one reset member located exterior to said latch housing whereby said ball latch means can be selectively disengaged without disassembly of said hose coupling, said reset member engaging said tapered ring through said slot in said latch housing whereby selected movement of said reset member serves to move said tapered ring against the bias of said spring means thereby allowing said latch balls to retract into said latch cavity and allowing disengagement of said first valve housing from said latch housing.

4. The improved breakaway hose coupling of claim 3 wherein said reset member comprises an annular ring circumscribing said latch housing.

5. The improved breakaway hose coupling of claim 3 wherein said slot is diagonally aligned relative to the axis of said tapered ring whereby selected rotation of said reset member serves to move said tapered ring against the bias of said spring means.

6. An improved breakaway hose coupling device for releasably joining the hose ends of two fluid communicating hoses and for selectively disengaging such hose ends in response to a disengaging force in excess of a preselected value being exerted on such hoses and/or said coupling, said coupling device comprising:

a first valve assembly for being secured on one said hose end and for selectively sealing said hose end to the flow of said fluid, said first valve assembly including a first valve housing having a forward end portion, said first valve housing being provided with an annular groove circumscribing said first valve housing;

a second valve assembly for being secured on another said hose end and for selectively sealing said hose end to the flow of said fluid, said second valve assembly including a second valve housing having a forward end portion;

a latch housing provided with a passage therethrough, and defining a first opening accessing said passage for receiving said forward portion of said first valve housing and a second opening accessing said passage for receiving said forward portion of said second valve housing, said latch housing being provided with means for securing said second valve housing in said passage of said latch housing, said latch housing being provided with a latch cavity and a latch ball aperture accessing said cavity for registering with said annular groove of said first valve housing as said first valve housing is received in said passage of said latch housing, said latch housing further defining at least one exterior slot accessing said latch cavity;

ball latch means housed within said latch cavity for securing said first valve housing in said latch housing in absence of said disengaging force in excess of said preselected value, said latch means including a plurality of latch balls for being received in said latch cavity of said latch housing, and for being selectively received through said latch ball aperture and into said latch ball groove of said first housing, said ball latch means further including locking means for releasably locking said latch balls in a position whereby at least a portion of said balls extend into said annular groove of said first valve housing in absence of said disengaging force in excess of said preselected value, and for releasing said latch balls for retraction into said latch cavity in response to said disengaging force in excess of said preselected value, said locking means including a tapered ring housed within said latch cavity, said ring defining a camming surface for engaging said latch balls and biasing said balls into said annular groove of said first valve housing, and further including spring means for biasing said tapered ring into engagement with said latch balls;

reset means for selectively disengaging said ball latch means in absence of said disengaging force in excess of said preselected value, whereby the selective insertion of said first valve housing into said latch housing and the selective disengaging of said first valve housing from said latch housing is facilitated, said reset means including a reset ring circumscribing said latch housing, said reset ring being provided with at least on fastening member for extending through said exterior slot of said latch housing and engaging said tapered ring of said ball latch means whereby selected movement of said reset ring moves said tapered ring against the bias of said spring means allowing said latch balls to retract into said latch cavity, thereby allowing insertion of said first valve housing in said latch housing and selected disengagement of said first valve housing from said latch housing.

* * * * *